United States Patent [19]
Unz

[11] 3,877,033
[45] Apr. 8, 1975

[54] NONUNIFORMLY OPTIMALLY SPACED ARRAY WITH UNIFORM AMPLITUDES

[76] Inventor: Hillel Unz, c/o Electrical Engineering Dept., University of Kansas, Lawrence, Kans. 66044

[22] Filed: Aug. 15, 1973

[21] Appl. No.: 388,575

[52] U.S. Cl............... 343/844; 343/719; 340/6 R; 340/9
[51] Int. Cl. .......................................... H01q 21/00
[58] Field of Search................... 343/719, 844, 853; 340/6 R, 9

[56] References Cited
UNITED STATES PATENTS
2,906,363  9/1959  Clay.................................. 343/844

Primary Examiner—Eli Lieberman

[57] ABSTRACT

The object of this invention is to provide a method for a new nonuniformly spaced array with uniform amplitudes for sonar, seismic and electromagnetic applications, where the optimum positions of the array elements along its axis are systematically determined by a new semi-rigorous synthesis technique. This new array will give a radiation pattern with much lower side-lobe levels than an equivalent uniformly spaced array with uniform amplitudes, and its optimal relationship between the side-lobe level and the beamwidth is similar or better than in the Dolph-Tchebysheff equivalent uniformly spaced array with tapered amplitudes. This method is based on the present invention by which the radiation pattern of a symmetric nonuniformly spaced array with uniform amplitudes and even number of elements can be expressed rigorously by a multiplication (product) of a set of cosines, whose arguments depend on the positions of the elements of the array. This new expression displays explicitly the zeros (nulls) of the nonuniformly spaced array radiation pattern and is especially suitable for an array with a large number of elements. This new array will be designated the Nonuniformly Optimally Spaced Array with Uniform Amplitudes, or in short, the NOSA-UA array.

6 Claims, 2 Drawing Figures

NONUNIFORMLY OPTIMALLY SPACED ARRAY WITH UNIFORM AMPLITUDES

The general idea of the non-uniformly spaced antenna arrays was invented by Unz in 1955, and was publicly proposed and published for the first time in his University of California (Berkeley, 1956) doctoral dissertation, where the first significant work on the subject was reported. From 1960 on, many additional contributions have been made on non-uniformly spaced arrays by numerous authors, and references to most of them may be found in recent books on antennas. However, the main synthesis problem of the non-uniformly spaced arrays, namely, finding the most optimum position of the elements of the array in order to produce a given specified radiation pattern, has not been solved rigorously to date. This is primarily due to the great difficulties in the solution of this highly non-linear problem. The trial and error computer techniques and the other pseudo-optimum synthesis methods suggested so far are of very limited utility, and are almost impossible to employ with arrays of a large number of elements. Thus, the non-uniformly spaced arrays cannot be technically designed at the present time to their full potential advantage, if at all, and therefore, are not generally used.

The first object of this invention is to provide a method by which the radiation pattern of a non-uniformly spaced array with uniform amplitudes can be expressed rigorously as a multiplication (product) of a set of numbers which depend on the positions of the elements of the array and is especially suitable for an array with a large number of elements. This new form of expressing the radiation pattern displays explicitly the zeros (nulls) in the array pattern and allows us to calculate the radiation pattern of a large non-uniformly spaced array with uniform amplitudes by using very few multiplication operations. By using this new method of expressing the radiation pattern in a multiplication form, the new Non-uniformly Optimally Spaced Array with Uniform Amplitudes (the NOS-UA array) could be designed to give a radiation pattern with zeros (nulls) in desired specific directions in the visible and/or the invisible region; by doing so one is able to control the radiation pattern within the visible range, for example, to lower the side-lobe level and/or to narrow the beamwidth of a directive radiation pattern. The multiplication process of the radiation pattern may be continued further in order to improve the radiation pattern of the array by the addition of elements. Thus, this method of expressing the radiation pattern as a multiplication of a set of numbers which depend on the positions of the elements of the non-uniformly spaced array with uniform amplitudes is an essential part of this invention.

The second object of this invention is to provide a non-uniformly spaced array with uniform amplitudes, where the array elements are distributed in optimum positions along the axis of the array, with reference to the given radiation pattern requirements and specifications. The optimal distribution of the elements along the array axis is determined so that the Non-uniformly Optimally Spaced Array with Uniform Amplitudes (the NOSA-UA array) of this invention will give a much better performance in its radiation pattern than an equivalent uniformly spaced array with uniform amplitudes of the same number of elements and the same total length of the array. In a directive array a better performance in its radiation pattern means a more optimal performance of its specified required characteristics, such as lower side-lobe level, and/or narrower beamwidth, and/or higher gain than specified, etc. A semi-rigorous synthesis technique is provided for the systematic determination of the optimum positions of the elements in the NOSA-UA array. Thus, this invention will provide a much better performance by the directive radiation pattern and much lower side-lobes using the NOSA-UA array, as compared to an equivalent uniformly spaced array with uniform amplitudes. While the semi-rigorous synthesis technique described later is for the symmetric NOSA-UA array, the invention by no means is limited to this particular case, and could be extended to the non-symmetric NOSA-UA array. Furthermore, since the NOSA-UA array is the building stone for any number of other more sophisticated arrays, this invention covers all other arrays, where they include in whole or in part the NOSA-UA array, including, but not limited to the following: symmetric and non-symmetric arrays, linear, two and three dimensional arrays, arrays of arrays, scanning arrays and phased arrays, broadband arrays and frequency independent arrays, omni-directional arrays, broadside arrays, endfire arrays and many others.

The invention is illustrated by the accompanying drawing in which.

All lengths in both arrays are in terms of half wavelengths ($\lambda/2$). Both arrays have the same total length of 1.42$\lambda$, where $\lambda$ is the wavelength, and both are designed for a phased array scanning range of $\pm 53°$ ($u_{scan} = \pm 1.8\pi$). In the symmetric equivalent uniformly spaced array in FIG. 1, one has the distances of the elements from the center:

$$d_1 = 0.20(\lambda/2) \quad d_2 = 0.61(\lambda/2) \quad d_3 = 1.02(\lambda/2)$$
$$d_4 = 1.42(\lambda 2)$$

side-lobe level: 23/100 (should be 21.2/100)
half power beamwidth: $2 \times 16°$ ($u = 0.28\pi$).
In the NOSA-UA array in FIG. 2 one has the distances of the elements from the center:

I. $\quad d_1 = 0.06(\lambda/2) \quad d_2 = 0.55(\lambda/2) \quad d_3 = 0.81(\lambda/2)$
$$d_4 = 1.42(\lambda/2)$$

side-lobe level: 8/100
half power beamwidth: $2 \times 17°$ ($u = 0.30\pi$).

Figure 1:
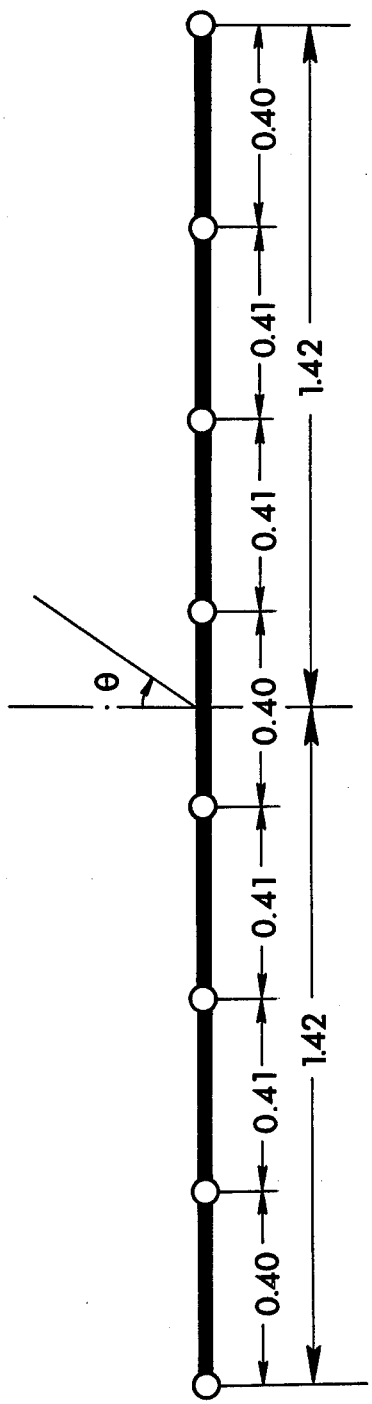
FIG. 1 represents the equivalent symmetric uniformly spaced array with eight elements of the same uniform amplitude.
Figure 2:
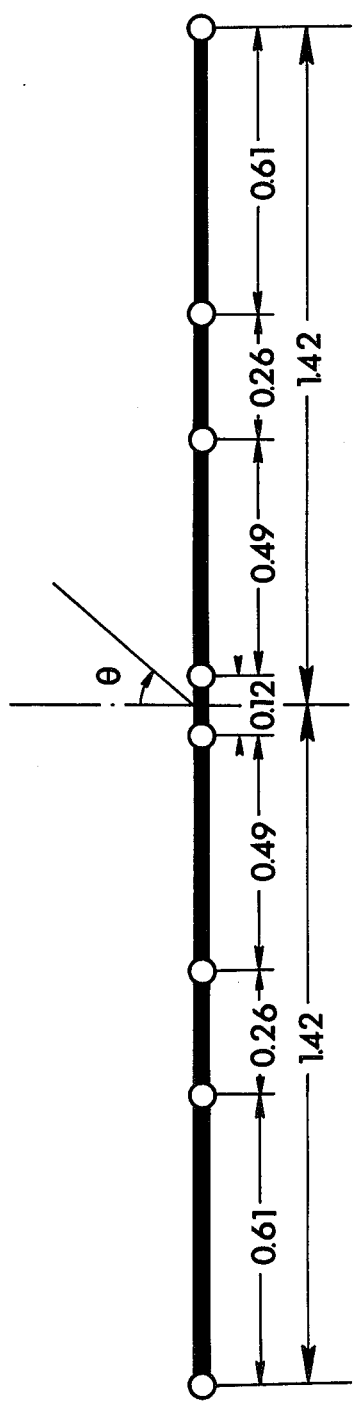
FIG. 2 represents the Nonuniformly Optimally Spaced Array with Uniform Amplitudes (the NOSA-UA array) with eight elements.

The systematic determination of the optimum positions of the elements in the Nonuniformly Optimally Spaced Array with Uniform Amplitudes (the NOSA-UA array) given in FIG. 2 has been accomplished by using the semi-rigorous synthesis technique described below. The equivalent uniformly spaced array with uniform amplitudes in FIG. 1 has been found by taking a uniformly spaced array of the same number of elements and the same total length as in the NOSA-UA array given in FIG. 2. Thus, the equivalent uniformly spaced array with uniform amplitudes in FIG. 1 gives a side-lobe level of 23/100, while the NOSA-UA array in FIG. 2 gives a side-lobe level of 8/100 only, with only a slight increase in the half power beamwidth. The side-lobe level power in the NOSA-UA array in FIG. 2 is 12 percent of the side-lobe level power in the equivalent uniform array in FIG. 1, and one obtains a much better performance of the directive radiation pattern by using the invention of the NOSA-UA array given in FIG. 2. Other NOSA-UA arrays with eight elements and a phased array scanning range of $\pm 53°$ ($u_{scan} = \pm 1.8\pi$) as in FIG. 2 have also been designed by using the semi-rigorous synthesis technique described below, and their corresponding element distances from the center and radiation pattern parameters are as follows:

II. $d_1 = 0.05(\lambda/2)$    $d_2 = 0.68(\lambda/2)$    $d_3 = 1.10(\lambda/2)$    $d_4 = 1.83(\lambda/2)$ side-lobe level: 12/100
  half-power beamwidth: $2 \times 14°$ ($u = 0.24\pi$).

III. $d_1 = 0.10(\lambda/2)$    $d_2 = 0.50(\lambda/2)$    $d_3 = 0.70(\lambda/2)$    $d_4 = 1.30(\lambda/2)$ side-lobe level: 6/100
  half-power beamwidth: $2 \times 20°$ ($u = 0.34\pi$).

IV. $d_1 = 0.22(\lambda/2)$    $d_2 = 0.38(\lambda/2)$    $d_3 = 0.49(\lambda/2)$    $d_4 = 1.09(\lambda/2)$ side-lobe level: 1/100
  half-power beamwidth: $2 \times 24°$ ($u = 0.41\pi$).

and the above NOSA-UA arrays could be compared favorably with the corresponding equivalent uniformly spaced arrays, which always have a side-lobe level of at least 21.2/100.

The radiation pattern $F(\theta)$ of a symmetric linear array with non-uniform spacings of the elements and uniform amplitudes for an even number of elements is given by:

$$F(\theta) = \sum_{p=1}^{P} \cos(kd_p \sin\theta) \quad (1)$$

where $k = 2\pi/\lambda$, $\lambda$ being the wavelength, $\theta$ is the angle with the normal to the array axis ($-(\pi/2) \leq \theta \leq +(\pi/2)$), and $d_p$ is the distance of the $p$th array element from the center of the array. The total number of the array elements is $2P$.

Equation (1) may be rewritten in the form:

$$F(u) = \sum_{p=1}^{P} \cos(x_p u) \quad (2)$$

where $u = \pi \sin\theta = 180° \sin\theta$ ($-\pi \leq u \leq +\pi$) and $x_p = d_p/(\lambda/2)$ gives the distance of the $p$th array element from the center in terms of half wavelengths. Let us substitute $y_p = x_p u$ in (2) and obtain:

$$F(u) = \sum_{p=1}^{P} \cos y_p \quad (3)$$

From well known identities in trigonometry one has for $2^n$ ($n = 0$) terms:

$$\cos A_0 = \cos A_0 \quad (4a)$$

and for $2^n$ ($n = 1$) terms:

$$\cos(A_0 + A_1) + \cos(A_0 - A_1) = 2\cos A_0 \cos A_1 \quad (4b)$$

By using (4b) for each pair one obtains for $2^n$ ($n = 2$) terms:

$\cos(A_0+A_1+A_2) + \cos(A_0+A_1-A_2) + \cos(A_0-A_1+A_2) + \cos(A_0-A_1-A_2)$
$= 2\cos(A_0+A_1)\cos A_2 + 2\cos(A_0-A_1)\cos A_2$
$= 2^2 \cos A_0 \cos A_1 \cos A_2 \quad (4c)$ By using (4c) and (4b) one obtains for $2^n$ ($n=3$) terms:

$\cos(A_0+A_1+A_2+A_3)+\cos(A_0+A_1+A_2-A_3)+\cos(A_0+A_1-A_2+A_3)+\cos(A_0+A_1-A_2-A_3)$
$+\cos(A_0-A_1+A_2+A_3)+\cos(A_0-A_1+A_2-A_3)+\cos(A_0-A_1-A_2+A_3)+\cos(A_0-A_1-A_2-A_3)$
$= 2^2\cos(A_0+A_1)\cos A_2 \cos A_3 + 2^2\cos(A_0-A_1)\cos A_2 \cos A_3$
$= 2^3 \cos A_0 \cos A_1 \cos A_2 \cos A_3 \quad (4d)$ The theorem which has been found above for particular cases of $2^n$ terms, where $n = 0, 1, 2, 3$, may be proved in general by using the method of mathematical induction in algebra. Let us assume that the following theorem is correct for $2^n (n=m)$ terms:

$$(\pm) \sum^{(2^m \text{ terms})} \cos(A_0 \pm A_1 \pm A_2 \pm A_3 \pm \ldots \pm A_m)$$

$$= 2^m \prod_{q=0}^{m} \cos A_q \quad (5)$$

where $$(\pm) \sum^{(2^m \text{ terms})}$$

means summation of all the permutations of (+) and (−) signs over $2^m$ terms, and $$\prod_{q=0}^{m}$$

means multiplying all the terms from $q=0$ to $q=m$. Let us now find the sum for $2^n (n=m+1)$ terms by using (4b) for each pair of terms:

$$(\pm) \sum^{(2^{m+1} \text{ terms})} \cos(A_0 \pm A_1 \pm A_2 \pm \ldots \pm A_m \pm A_{m+1})$$

$$= (\pm) \sum^{(2^m \text{ terms})} \cos(A_0 \pm A_1 \pm A_2 \pm \ldots \pm A_m + A_{m+1})$$

$$+ (\pm) \sum^{(2^m \text{ terms})} \cos(A_0 \pm A_1 \pm A_2 \pm \ldots \pm A_m - A_{m+1})$$

$$= 2\cos A_{m+1} (\pm) \sum^{(2^m \text{ terms})} \cos(A_0 \pm A_1 \pm A_2 \pm \ldots \pm A_m) \quad (6a)$$

Substituting (5) into (6a) one obtains:

$$(\pm) \sum^{(2^{m+1} \text{ terms})} \cos(A_0 \pm A_1 \pm A_2 \pm \ldots \pm A_m \pm A_{m+1})$$

$$= 2\cos A_{m+1} \left( 2^m \prod_{q=0}^{m} \cos A_q \right) = 2^{m+1} \prod_{q=0}^{m+1} \cos A_q \quad (6b)$$

Thus, we have shown that if (5) is correct for $2^n(n=m)$ terms, then (6b) is also correct for $2^n(n=m+1)$ terms. Since we have shown in (4) that (5) is correct for $2^n$ terms where $n=0, 1, 2, 3$, by choosing $m=3$ in (5) we have shown that it is correct for $m+1=4$ in (6) and so on. Thus, the general identity in (5) has been proved and it has been shown as a part of this invention how to represent a summation of cosines of the present form by a multiplication (product) form.

A uniformly spaced array with uniform amplitudes (FIG. 1) has side lobes at the theoretical level of 21.2% (−13.5 db) of the main beam, regardless of the length of the array and the number of the elements, provided that the array is not too short. By using the multiplication form in equation (5) and the semi-rigorous synthesis technique described below for the determination of the optimum positions of the elements of the Nonuniformly Optimally Spaced Array with Uniform Amplitudes (the NOSA-UA array) of this invention, one is able to design an array with uniform amplitudes with much lower side-lobe level (FIG. 2), depending on the phased array scanning range. In the semi-rigorous synthesis technique described below only one specific procedure will be described where equation (5) has been used for the design of the NOSA-UA array, where the scanning range is a requirement of the design. However, the multiplication equation (5) may be used in a similar manner for the design of the NOSA-UA array by a similar semi-rigorous procedure, when the design requirements include, but are not limited to, the length of the array, and/or its number of elements, and/or the half power beamwidth, and/or the side-lobe level, and/or the scanning range, etc. The technique will be essentially similar, using the multiplication equation (5) and a semi-rigorous synthesis technique.

The semi-rigorous syntehsis technique for the design of the NOSA-UA array is based on using the multiplication equation (5), by which the radiation pattern $F(u)$ in equation (2) could be designed to give zeros (nulls) in desired specific directions in the visible and/or the invisible region. By controlling the distribution of the zeros (nulls) of the radiation pattern in specific directions, one is able to control the other parameters of the radiation pattern like its side-lobe level, its beamwidth, its gain, etc. The present semi-rigorous technique described below is especially suitable for directive NOSA-UA arrays, and for an array with a large number of elements. The first step in the semi-rigorous synthesis method is to substitute in the multiplication equation (5):

$$A_i = \alpha_i u \tag{9}$$

and specify the first zeros (nulls) $u_q^{(1)}$ in the desired specific directions of the radiation pattern on the right hand side of equation (5) in the form, since $\cos 90° = 0$:

$$A_q = \alpha_q u_q^{(1)} = 90°; \quad \alpha_q = 90°/u_q^{(1)} \tag{10a}$$

where $u_q^{(1)}$ is specified in degrees and $\alpha_q$ is found as a non-dimensional number. Since $\cos(90° l) = 0$ where $l = 1, 3, 5 \ldots$ once the first zero (null) $u_q^{(1)}$ has been specified, one has the other zeros (nulls) $u_q^{(3)}, u_q^{(5)}, u_q^{(7)} \ldots$ from (10a) in the form:

$$u_q^{(l)} = l \, 90°/\alpha_q = l \, u_q^{(1)} \text{ where } l = 1, 3, 5, 7 \ldots \tag{10b}$$

Thus, by specifying the first zero (null $u_q^{(1)}$ in the radiation pattern one obtains $\alpha_q$ from (10a) and one specifies the other zeros (nulls) from (10b). One is able to specify arbitrarily the first zero (null) $u_q^{(1)}$ of the radiation pattern for each of the $(m+1)$ terms on the right hand side of equation (5) and the other zeros (nulls) $u_q^{(l)} = l \, u_q^{(1)}$ for $l = 1, 3, 5 \ldots$ will be thus determined. Once the first zeros (nulls) $u_q^{(1)}$ have been chosen and the corresponding $\alpha_q$ have been determined from (10a), one is able to calculate the radiation pattern $F(u)$ in a normalized form (maximum value = 1) by substituting (9) and (10a) on the right hand side of (5) as follows:

$$F(u) = \prod_{q=0}^{m} \cos \alpha_q u = \prod_{q=0}^{m} \cos 90° \frac{u}{u_q^{(1)}} \tag{11}$$

where $F(u=0) = 1$ and $F(u)$ is expressed as a multiplication of a set of cosines. Notice that the radiation pattern is completely specified once the $(m+1)$ first nulls $u_0^{(1)} < u_1^{(1)} < u_2^{(1)} < u_3^{(1)} < \ldots < < u_m^{(1)}$ have been chosen, and additional zeros (nulls) will appear at $u = u_q^{(l)} = l \, u_q^{(1)}$ where $l = 1, 3, 5, 7, \ldots$ as given in (10b). By choosing different sets of first zero (null) $u_q^{(1)}$ one obtains different radiation patterns. The method is semi-rigorous since, once the set of the first zero (null) has been chosen, the radiation pattern $F(u)$ should be calculated in accordance with (11). If the side-lobe level found from the calculation of $F(u)$ is too high for the radiation pattern requirements, another set of first zero (null) should be chosen, where the first zeros (nulls) are closer to each other, so that the side-lobe level will be smaller, until the specified side-lobe level will be reached. For all these calculations one could take the same first zero (null) $u_0^{(1)}$, but choose the other first zeros (nulls) closer and closer together until the calculated $F(u)$ gives the specified side-lobe level. In many cases, the distances between the chosen first nulls could be the same. However, one should take into account the existence of the other secondary $l$-th zeros (nulls) when the first zeros (nulls) are chosen, in order not to have some zeros (nulls) of one set superimposed on another set of zeros (nulls). The radiation pattern $F(u)$ should be below the side-lobe level only through the range $u_0^{(1)} \leq u \leq u_{max}$ achieved by a trail and error calculation of $F(u)$ using (11) and changing the distribution of the first zeros (nulls). The closer together the first zeros (nulls) are, the smaller is the side-lobe level between them. As one gains more experience the number of the trial and error calculations of $F(u)$ becomes smaller and smaller. A table describing the results for each choice of first zeros (nulls) will be most useful in order to cut down on the number of trial and error calculations of $F(u)$. The number of the first zeros (nulls) chosen will also determine the number of the NOSA-UA array elements which will be used eventually.

Once the first zeros (nulls) $u_q^{(1)}$ have been chosen so that the radiation pattern $F(u)$ has been calculated by (11) to be below the specified side lobe level in the region $u_0^{(1)} \leq u \leq u_{max}$, one calculates the corresponding $\alpha_q = 90°/u_q^{(1)}$ in accordance with (10a), where $u_q^{(1)}$ are specified in degrees and $\alpha_q$ is a set of non-dimensional numbers. The next step of the invention is to decide the actual range of the radiation pattern over which the side-lobe level has to be below the prescribed value. This range will be indicated by $|u| \leq u_{scan}$, where $u_{scan}$ has to be specified as a parameter of the design. In case of a phased array scanning over the whole visible region $u_{scan} = 2\pi$. In case of no scanning at all, one takes $u_{scan} = \pi$ and the radiation pattern will be below the prescribed side-lobe level over the whole visible region $-90° \leq \theta \leq 90°$. In case of only partial phased array scanning one has:

$$u_{scan} = \pi (1 + |\sin \theta_{scan}|); \pi \leq u_{scan} \leq 2\pi \quad (12)$$

where $\theta_{scan}$ represents the maximum phased array scanning angle. Once $u_{scan}$ has been specified as the parameter of the design, one has the linear transformation in (11):

$$\alpha_q u_{max} = \beta_q u_{scan} \; ; \; \beta_q = \alpha_q \, u_{max}/u_{scan} \quad (13a)$$

and using (13a) one calculates the new set of parameters $\beta_q$. It should be pointed out that the actual first zeros (nulls) $u_q^{(1)actual}$ of the final radiation pattern are transformed as in (13a):

$$90° = \alpha_q u_q^{(1)} = \beta_q u_q^{(1)actual} \; ; \; u_q^{(1)actual} = u_q^{(1)} \alpha_q/\beta_q = u_q^{(1)} u_{scan}/u_{max} \quad (13b)$$

where in (13) $u_{scan} = 2\pi$ for phased array scanning in the full visible range, $u_{scan} = \pi$ for no scanning, and is determined by (12). The actual beamwidth $u_o^{(1)actual}$ of the final radiation pattern is transformed from $u_o^{(1)}$ in the same manner by taking $q=0$ in (13b). The same linear transformation as in (13b) will apply to all the other corresponding zeros (nulls). This is the reason that any reasonable $u_o^{(1)}$ could be used at the beginning as a given arbitrary parameter.

Substituting the new set of parameters $A_q = \beta_q u$ in (5) and comparing with (2), one obtains for the radiation pattern $F(u)$:

$$F(u) = \sum_{p=1}^{P} \cos x_p u = (2^m) \prod_{q=0}^{m} \cos \beta_q u$$

$$= (\pm) \sum^{(2^m \text{ terms})} \cos(\beta_0 \pm \beta_1 \pm \beta_2 \pm \beta_3 \pm \ldots \pm \beta_m)u \quad (14a)$$

Since $F(u)$ is normalized, the factor $(2^m)$ in (14a) could be ignored. From (14a) one thus can find the positions of the NOSA-UA array elements in the form:

$$x_p = |\beta_0 + \beta_1 + \beta_2 + \beta_3 + \ldots + \beta_m| \quad (14b)$$

where the absolute value is taken since the cosine is an even function. All the $2^m$ positions $x_p$ of the elements of the NOSA-UA array are found by taking all the possible permutations of plus (+) and minus (−) signs in (14b), a total of $2^m$ permutations. The actual total length of the NOSA-UA array $L_{total}$ is given by:

$$L_{total} = 2(\beta_0 + \beta_1 + \beta_2 + \beta_3 + \ldots + \beta_m) \lambda/2 = (\beta_0 + \beta_1 + \beta_2 + \beta_3 + \ldots + \beta_m)\lambda \quad (14c)$$

From (14) we see that there are found $2^m$ terms of positions $x_p$ of the array elements. Thus, the total number of the elements in the symmetric NOSA-UA array are $2P = 2 \cdot 2^m = 2^{m+1}$, where $(m+1)$ is the number of the cosines in the multiplication formula and the number of the first zeros (nulls) prescribed in the radiation pattern originally. Once the NOSA-UA array has been thus designed, its radiation pattern could be checked by using the original summation formula in (2). The eight element NOSA-UA array (I) in FIG. 2 has been designed using the above invention and specifying by the above procedure a total number of three first zeros (nulls) in the radiation pattern. The other NOSA-UA arrays (II, III, IV) have been similarly designed by specifying three first zeros (nulls) with closer spacings between them. The uniformly spaced array in FIG. 1 has been designed for comparison purposes by taking a uniformly spaced array of the same total length and the same number of uniformly spaced elements. It should be mentioned that if two elements in (14b) are found to be too close to each other, namely $|\beta_i|$ is too small, one could either change the original distribution of the first zeros (nulls), or alternatively, superimpose the two close array elements as one element with double the amplitude.

A uniformly spaced array with uniform amplitudes has side lobes at the level of 21.2% (−13.5 db) of the main beam, regardless of the length of the array and the number of the elements, provided that the number of elements of the array is not too small. In order to reduce the side-lobe level in a uniformly spaced array, one has to taper the amplitudes of the elements of the array and obtain a uniformly spaced array with nonuniform amplitudes. An example of such an array is the well known Dolph-Tchebysheff directive array giving the optimal radiation pattern in uniformly spaced arrays. However, one has to use additional equipment and additional space in a sonar array, for example, in order to taper the amplitudes of the array elements and obtain lower side-lobe levels. By using the Nonuniformly Optimally Spaced Array with Uniform Amplitudes (the NOSA-UA array) of the present invention described above, one is able to achieve much smaller side-lobe levels than in an equivalent uniformly spaced array with uniform amplitudes of the same total length and the same number of elements. The side-lobe level achieved in the NOSA-UA array depends on the design requirements of the beamwidth and the phased array electronic scanning maximum angle. The side-lobe level is controlled by the positions of the elements in the NOSA-UA array of the present invention, where the amplitudes of all the elements are uniform and the same. Thus, one obtains a lower side-lobe level from the NOSA-UA array, without using any additional equipment and premium equipment space for tapering the amplitudes. One changes only the positions of the elements in the NOSA-UA array in order to lower the side-lobe level. At the same time the half power beamwidth increases slightly, and the optimal relationship between the side-lobe level and the beamwidth in the NOSA-UA array is similar or better than the same relationship in the Dolph-Tchebysheff equivalent uniformly spaced array with tapered amplitudes.

Instead of tapering the amplitudes of the elements in a uniformly spaced array as in the standard Dolph-Tchebysheff array, one obtains similar optimal relationship or better in the NOSA-UA array by changing the positions of the elements only and keeping all the amplitudes of the elements uniform and the same. For a large array one saves much on the equipment expense and the premium equipment space, which is usually required in a uniformly spaced array for tapering the amplitudes of the elements. No such equipment is required in the NOSA-UA array.

As can be seen above in equation (14a), the synthesis procedure for the design of the NOSA-UA array is especially suitable for an array with a large number of elements. The total number of the elements in the symmetric NOSA-UA array is $2^{m+1}$, where ($m+1$) is the number of the cosines in the multiplication formula and the number of the first zeros (nulls) prescribed in the radiation pattern originally. Thus, one has:

| No. elements | 4 | 8 | 16 | 32 | 64 | 128 | 256 | 512 | 1024 |
|---|---|---|---|---|---|---|---|---|---|
| No. first zeros | 2 | 3 | 4 | 5 | 6 | 7 | 8 | 9 | 10 |

In order to design a NOSA-UA array of 1,024 elements, one has to prescribe only 10 first zeros (nulls) in the radiation pattern and express it only as a multiplication of 10 cosine terms. Thus, the present invention of the NOSA-UA array is especially suitable for arrays of a very large number of elements.

Since the Nonuniformly Optimally Spaced Array (the NOSA-UA array) described in the foregoing specifications could be used as the basis for building more sophisticated arrays with specific or minimax performance indices requirements, this invention covers, but is not limited to, arrays with specific requirements on the radiation pattern, side-lobe level, beamwidth, impedance, bandwidth, mutual coupling, gain, directivity, polarization, noise temperature, signal to noise ratio, interference ratio, and any other specific indices, if the array includes in whole or in part certain definitive aspects of this invention as a part of its analysis or synthesis. This invention also covers this array, when the elements used in the array are of different types, including but not limited to, dipoles, slots, horns, apertures, parabolic reflectors, dishes, and many others. This invention also covers this array when it is used for all different purposes. Many of the design techniques in prior art developed for electromagnetic arrays can and have been applied with modifications to acoustic arrays, seismic arrays and arrays in other fields. Thus, this invention described in the foregoing specifications covers, but is not limited to, all such arrays or combinations of them in other fields for any purpose. This invention is especially suitable for acoustic (sonar) arrays and seismic arrays where the number of array elements per wavelength requirements is relatively large as seen from the above examples. This invention covers the NOSA-UA acoustic arrays and sonar arrays, used with acoustic elements of any type, when used under water or above water, for whatever purpose. This invention covers the NOSA-UA seismic arrays, used with seismic elements, geophones, seismometers, seismographs or other elements, when used underground or above ground for whatever purpose. Thus, the foregoing invention of the NOSA-UA array covers any array of any shape and size, and used with any kind of elements for any purpose, provided that the invention described here will be used there in whole or in part, or will be used there as a part of its analysis or synthesis during the design procedure.

While in the foregoing specification, I have set forth certain details of the Nonuniformly Optimally Spaced Array with Uniform Amplitudes (the NOSA-UA array) and its semi-rigorous synthesis technique for a lower side-lobe level of its directive radiation pattern, as compared to an equivalent uniformly spaced array, for the purpose of illustrating one mode of the invention, it will be understood that such details may be varied widely by those skilled in the art without departing from the spirit of my invention, and it is therefore aimed to cover all such changes and modifications in all areas of endeavor where arrays are used, as fall within the true spirit and scope of this invention.

What I claim is:

1. A method of synthesis for controlling the radiation pattern of a symmetric nonuniformly spaced array with uniform amplitudes and even number of elements, said method based on the following rigorous relationship which expresses the array radiation pattern $F(u)$ by a multiplication (product) of a set of cosines, whose arguments depend on the positions of the elements of the array, where the zeros (nulls) of the array radiation pattern $F(u)$ are displayed explicitly:

$$F(u) = \sum_{p=1}^{P} \cos x_p u$$
$$= (\pm) \sum^{(2^m \text{ terms})} \cos (\beta_0 \pm \beta_1 \pm \beta_2 \pm \beta_3 \pm \ldots \pm \beta_m) u$$
$$= (2^m) \prod_{q=0}^{m} \cos \beta_q u = (2^m) \prod_{q=0}^{m} \cos 90° \frac{u}{u_q^{(1) \text{ actual}}}$$

(A)

where
$u = \pi \sin \theta$,
$\theta$ being the angle with the normal to the array axis,
$x_p$ is the distance of the $p$th array element from the center of the array in terms of half wavelengths ($\lambda/2$), $$(\pm) \sum^{(2^m \text{ terms})}$$

means summation of all the permutations of the plus (+) and minus (−) signs over $2^m$ terms, $$\prod_{q=0}^{m}$$

means the multiplication (product) of all the terms from $q=0$ to $q=m$, $u_q^{(1) \text{ actual}}$ is the set of the actual first zeros (nulls) of the array radiation pattern $F(u)$, and $\beta_q$ is the set of the non-dimensional parameters, and the optimum positions $x_p$ of the elements of the Nonuniformly Optimally Spaced Array with Uniform Amplitudes are determined by:

$$x_p = |\beta_0 + \beta_1 + \beta_2 + \beta_3 \pm \ldots \pm \beta_m|$$

(B)

where the $2^m$ positions of the optimum $x_p$ will be found by taking all the possible permutations of the plus (+) and the minus (−) signs.

2. A method of synthesis for controlling the side-lobe level and/or the beamwidth of the directive radiation pattern $F(u)$ of a symmetric nonuniformly spaced array with uniform amplitudes and even number of elements, said method based on specifying the set of the actual first zeros (nulls) $u_q^{(1)actual}$ of the array radiation pattern $F(u)$ given in claim 1, and calculating the set of the non-dimensional parameters $\beta_q = 90°/u_q^{(1)actual}$ and the optimum positions $x_p$ of the array elements as in claim 1, where the determination of the specified actual first zeros (nulls) $u_q^{(1)actual}$ will be done by a semi-rigorous trial-and-error approach of calculating the radiation pattern $F(u)$ for several cases, and will depend on the phased array scanning angle requirement and the other specified parameters of the array and the array radiation pattern.

3. An arrangement of a set of elements in a nonuniformly optimally spaced array with uniform amplitudes, as specified in claim 1, in which each element is an acoustic or sonar radiator or receiver, or a combination of them, used under water or above water.

4. An arrangement of a set of elements in a nonuniformly optimally spaced array with uniform amplitudes, as specified in claim 1, in which each element is a seismic radiator or receiver, like geophone, seismometer, seismograph, etc., or a combination of them, used under ground or above ground.

5. An arrangement of a set of elements in a nonuniformly optimally spaced array with uniform amplitudes, as specified in claim 1, in which each element is an electromagnetic antenna radiator or receiver, like dipole, slot, horn, aperture, dish, parabolic reflector, etc., or a combination of them.

6. An array comprising a grouping of sub-arrays, each designed in accordance with the method set out in claim 1.

* * * * *